(12) United States Patent
Miyatake et al.

(10) Patent No.: US 10,734,931 B2
(45) Date of Patent: Aug. 4, 2020

(54) BRUSHLESS SYNCHRONOUS POWER GENERATION APPARATUS

(71) Applicant: Mitsubishi Electric Corporation, Chiyoda-ku, Tokyo (JP)

(72) Inventors: Ryoji Miyatake, Tokyo (JP); Ayumu Yamada, Tokyo (JP); Keisuke Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/312,412

(22) PCT Filed: Aug. 23, 2016

(86) PCT No.: PCT/JP2016/074444
§ 371 (c)(1),
(2) Date: Dec. 21, 2018

(87) PCT Pub. No.: WO2018/037470
PCT Pub. Date: Mar. 1, 2018

(65) Prior Publication Data
US 2019/0245466 A1 Aug. 8, 2019

(51) Int. Cl.
*F02N 11/04* (2006.01)
*H02K 23/52* (2006.01)
(Continued)

(52) U.S. Cl.
CPC ............ *H02P 9/08* (2013.01); *H02K 13/003* (2013.01); *H02K 19/38* (2013.01); *H02P 1/50* (2013.01);
(Continued)

(58) Field of Classification Search
CPC ... H02P 9/08; H02P 9/302; H02P 1/50; H02K 19/38
See application file for complete search history.

(56) References Cited

U.S. PATENT DOCUMENTS 3,809,914 A 5/1974 Kilgore et al.
3,823,357 A 7/1974 Sapper
(Continued)

FOREIGN PATENT DOCUMENTS

JP 04096698 A 3/1992
JP 2014239594 A 12/2014

OTHER PUBLICATIONS

Extended European Search Report dated Jul. 8, 2019, issued by the European Patent Office in corresponding European Application No. 16914145.4. (7 pages).
(Continued)

*Primary Examiner* — Tulsidas C Patel
*Assistant Examiner* — Thomas K Quigley
(74) *Attorney, Agent, or Firm* — Buchanan Ingersoll & Rooney PC (57) ABSTRACT

As a configuration of carrying out a turning operation of a brushless synchronous power generation apparatus, there are provided a synchronous generator, an AC exciter, a rotary rectifier attached to an armature of the AC exciter, and short-circuiting means which three-phase short-circuits armature windings of the AC exciter, wherein the armature windings of the AC exciter are short-circuited, causing the AC exciter to operate as an induction motor, thus rotating the rotor shaft of the synchronous generator.

10 Claims, 7 Drawing Sheets

(51) Int. Cl.
  *H02P 9/08*   (2006.01)
  *H02P 1/50*   (2006.01)
  *H02P 9/30*   (2006.01)
  *H02K 13/00*  (2006.01)
  *H02K 19/38*  (2006.01)
(52) U.S. Cl.
  CPC ............... *H02P 9/30* (2013.01); *H02P 9/302* (2013.01); *H02P 2207/05* (2013.01)

(56) References Cited

U.S. PATENT DOCUMENTS

| | | | |
|---|---|---|---|
| 5,796,233 A * | 8/1998 | Satake | H02K 16/00 318/705 |
| 2002/0153859 A1 | 10/2002 | Dymond et al. | |
| 2004/0164695 A1 * | 8/2004 | Hallidy | H02K 17/26 318/538 |
| 2012/0211981 A1 * | 8/2012 | De Wergifosse | F02C 7/275 290/31 |
| 2013/0193903 A1 * | 8/2013 | Illiano | H02P 9/123 318/716 |
| 2015/0035471 A1 * | 2/2015 | Kori | H02P 1/50 318/718 |

OTHER PUBLICATIONS

International Search Report (PCT/ISA/210) dated Nov. 15, 2016, by the Japan Patent Office as the International Searching Authority for International Application No. PCT/JP2016/074444.

Written Opinion (PCT/ISA/237) dated Nov. 15, 2016, by the Japan Patent Office as the International Searching Authority for International Application No. PCT/JP2016/074444.

* cited by examiner

BRUSHLESS SYNCHRONOUS POWER GENERATION APPARATUS

TECHNICAL FIELD

The present invention relates to a brushless synchronous power generation apparatus, and particularly to a configuration of a turning operation which causes a turbine and synchronous generator shaft of the brushless synchronous power generation apparatus to rotate at low speed.

BACKGROUND ART

A brushless synchronous power generation apparatus is configured by combining a synchronous generator, an AC exciter, and a rotary rectifier. A static frequency converter (hereafter abbreviated to SFC) is connected to a stator armature winding of the synchronous generator, in which is applied an SFC starting system which changes the frequency of armature current of the synchronous generator and puts the synchronous generator in starting operation as a synchronous motor.

On the other hand, when a turbine and synchronous generator rotor shaft used in a power plant with a steam or gas turbine or the like is left remaining in high-temperature state and in non-rotating state while in non-operation, shaft bending occurs due to thermal strain or to the self-weight of the rotor. In order to prevent the shaft bending, a turning operation, which causes the turbine and generator rotor shaft to rotate at low speed (about two to ten r/min) for a certain time after the non-operation, is carried out by using a turning device formed of, for example, a drive motor and a gear.

In general, two kinds of systems: a turning motor and an SFC starting system, are installed in the device which drives the turbine and synchronous generator rotor shaft, and are used in different ways. The SFC starting system is used for an operation which causes an increase in speed from a turning rotation speed of 3 r/min to a gas turbine ignition rotation speed of 2000 to 2400 r/min, and the turning motor is used for a turning operation in which the turning rotation speed increases from no rotation of 0 r/min to 3 r/min and, after reaching 3 r/min, remains at 3 r/min for a certain time.

An SFC starting device (a 120-degree energizing current type inverter) is such that in a low rotation speed region, for example, at a turning rotation speed of 3 r/min, SFC current is intermittently supplied, leading to a decrease in SFC current control accuracy. Because of this, control at a low rotation speed of several r/min is difficult with the SFC starting device, and in general, the SFC starting device is not suitable for the turning operation. Also, when the turning motor is started from no rotation to a gas turbine ignition rotation speed of 2000 to 2400 r/min, the capacity and the whole configuration of the turning motor are extremely large, which proves not to be economical, so it is common that a rotor shaft drive is of a combination of the turning-dedicated gear and motor and the SFC starting.

A power generation system is such that direct current is supplied to a rotor field winding of the synchronous generator, and a magnetic flux generated from the rotor winding is interlinked with the stator armature winding, as a result of which an induced electromotive force is generated in the armature winding, thereby carrying out power generation. As the technique of supplying direct current to the rotor field winding, there are two kinds: a "slip ring system which brings carbon brushes into mechanical contact with steel rings" and a "brushless system which uses a rotating machine on which a three-phase full-wave rectifier circuit is mounted".

A brushless exciter is of a structure in which an armature winding is wound on the rotor, while a field winding is wound on the stator, and the rotor armature winding of the brushless exciter and the rotor field winding of the synchronous generator are on the same rotating shaft. Because of this, a current voltage induced in the rotor armature winding of the brushless exciter is rectified by a rotary rectifier of three-phase full-wave rectification, and direct current is supplied to the rotor field winding of the synchronous generator.

In the case of a power plant in which a gas turbine and a synchronous generator are combined, the gas turbine is short of torque as a prime mover and has a rotating region in which the shafting cannot be increased in speed, so that the SFC is connected to the stator armature winding of the synchronous generator, and the frequency of armature current of the synchronous generator is changed, thus putting the synchronous generator in starting operation as a synchronous motor.

When in starting operation, the synchronous generator is operated as the motor, but in the same way as in the operation as the generator when at rated speed, it is necessary to supply direct current to the synchronous generator field winding.

In a brushless excitation system, when DC field current is applied to the AC exciter field winding, no induced voltage is generated in the AC exciter armature winding when the rotor shaft is stopped, and it is difficult to supply the field current to the synchronous generator field winding. Also, in the state of a low rotation speed of several r/min, there is the problem of a short supply of direct current to the synchronous generator field winding.

With respect to the problem, PTL 1 proposes a system wherein dq-axis two-phase AC windings are used as the stator field winding of the AC exciter, and the d-axis winding and the q-axis winding are AC excited by an inverter at a phase difference of 90 degrees, thereby enabling a rotating field to be generated from the stator, thus enabling a required DC output to be generated even when rotation is stopped.

Also, as for a turning device formed of, for example, a drive motor and a gear, a configuration which is high in reliability without using the gear is desired in light of a problem such as the maintenance of a mechanical device, and a survey of the configuration has found that PTL 2 proposes a configuration such that a brushless excitation device, being configured of a first AC exciter which excites with a DC power source from a stator side and a second AC exciter of a wound rotor induction motor-driven type which excites with a three-phase power source from the stator side, is disposed on the same shaft as a synchronous generator, wherein a first rotary rectifier is connected to an armature winding of the first AC exciter, a second rotary rectifier is connected to a secondary winding of the second AC exciter, and the first rotary rectifier is connected in series to the DC side of the second rotary rectifier, thus supplying excitation current to the field winding of the synchronous generator.

CITATION LIST

Patent Literature

PTL 1: JP-A-2014-239594
PTL 2: JP-A-4-96698

SUMMARY OF INVENTION

Technical Problem

As seen in the heretofore described turning device, a rotary electric machine generally has two generator and motor operating states, and an AC exciter in an AC brushless excitation system is operated as the generator, but in the event that the AC exciter can be operated as the motor, a mechanical torque is generated, enabling a gas turbine and generator rotor shaft to rotate in turning operation.

When operating the AC exciter as the motor, it is necessary to AC excite the stator winding in order to operate the AC exciter as an induction motor, and so the stator winding is AC excited by an inverter device, thereby it being possible to operate the AC exciter as the motor.

In an AC field brushless exciter, DC excitation is carried out when at rated speed, while AC excitation is carried out when SFC starts, and energy generated in the armature winding (rotor winding) of the AC exciter is supplied to the field winding of the synchronous generator via the rotary rectifier, leading to a copper loss of the field winding of the synchronous generator. On the other hand, as it is not necessary, when in turning operation, to excite the field winding of the synchronous generator, the AC exciter is not energized and stops in function. In the state in which the field excitation of the synchronous generator is not required, the AC exciter is operated as the motor, and the turbine and generator rotor shaft is caused to rotate at low speed, thereby aiming at omitting the turning-dedicated gear and motor.

Solution to Problem

A brushless synchronous power generation apparatus of the invention includes a synchronous generator; an AC exciter directly connected to a rotor of the synchronous generator; a rotary rectifier attached to an armature of the AC exciter; and short-circuiting means which three-phase short-circuits armature windings of the AC exciter, wherein the armature windings of the AC exciter are three-phase short-circuited, causing the AC exciter to operate as an induction motor, thus rotating a rotor shaft of the synchronous generator.

Advantageous Effects of Invention

The AC exciter is operated as a motor while not being operated as a brushless exciter, causing a turbine and generator rotor shaft to rotate at low speed, and thereby it is possible to omit a turning-dedicated gear and motor. This eliminates the need of the turning-dedicated gear and motor, as well as the need of their installation space, and it is thus possible to compactify a power plant building, enabling a reduction in cost.

DESCRIPTION OF EMBODIMENTS

Embodiment 1

Hereafter, a description will be given, based on the drawings, of Embodiment 1 of a brushless synchronous power generation apparatus according to the invention. In the drawings, identical signs each show identical portions or equivalent portions.

Figure 1:
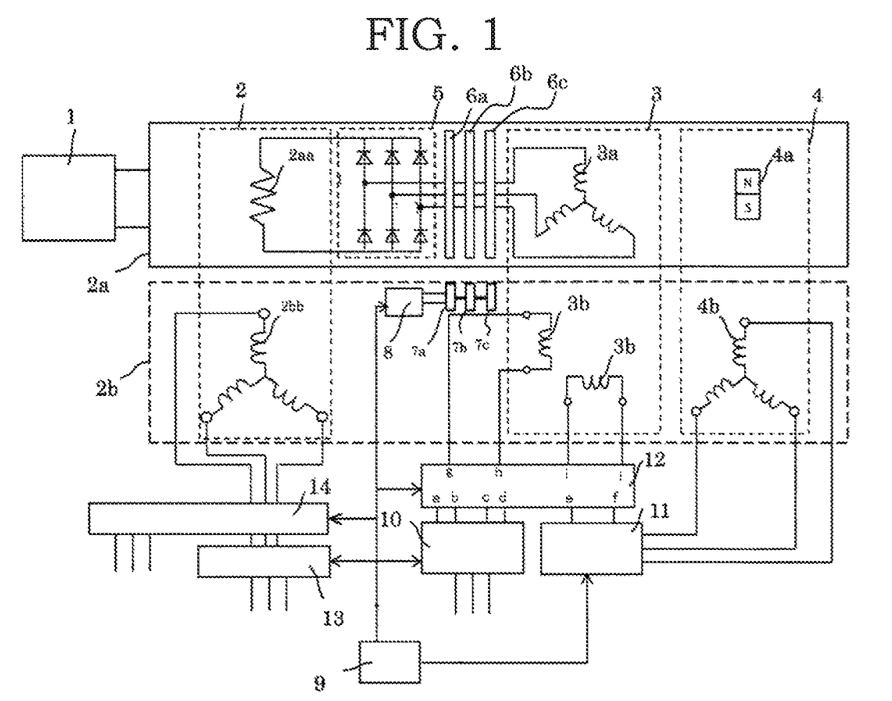
FIG. 1 is a schematic configuration diagram of a brushless synchronous power generation apparatus of Embodiment 1 of the invention.

FIG. 1 shows a schematic configuration of a brushless synchronous power generation apparatus of Embodiment 1 of the invention. FIG. 1 shows a configuration necessary for an SFC starting system, and for a turning operation, in a gas turbine power plant.

The brushless synchronous power generation apparatus has a gas turbine rotor shaft 1 provided with a synchronous generator 2, an AC exciter 3, and a permanent magnet synchronous generator 4. In practice, a rotor 2a of the synchronous generator 2 is connected to the gas turbine rotor shaft 1, and the rotor 2a of the synchronous generator 2 is provided with a field winding 2aa of the synchronous generator 2, a rotary rectifier 5, armature windings 3a of the AC exciter 3, and a field permanent magnet 4a of the permanent magnet synchronous generator 4.

Also, armature windings 2bb of the synchronous generator 2, field windings 3b of the AC exciter 3, and armature windings 4b of the permanent magnet synchronous generator 4 are provided as a stator 2b side of the synchronous generator 2, and brushless excitation is such that a three-phase AC output of the armature windings 3a of the AC exciter 3 directly connected to the rotor 2a of the synchronous generator 2 is rectified by the rotary rectifier 5 attached to the armature of the AC exciter 3, exciting the field winding 2aa of the synchronous generator 2.

Particularly, in Embodiment 1, on the rotor 2a side of the synchronous generator 2, three slip rings 6a, 6b, 6c are provided between the armature windings 3a of the AC exciter 3 and the rotary rectifier 5, and are connected respectively to three U, V, and W phases of the armature windings 3a of the AC exciter 3. Brushes 7a, 7b, 7c are provided on the stator 2b side of the synchronous generator 2 so as to correspond to the slip rings 6a, 6b, 6c, and a configuration is such that the brushes 7a, 7b, 7c are moved by a brush moving device 8 so as to come into contact with the slip rings 6a, 6b, 6c. That is, the brushes 7a, 7b, 7c are provided corresponding to the slip rings 6a, 6b, 6c, and a three-phase short circuit is carried out by bringing the brushes into contact with the slip rings, so that the slip rings 6a, 6b, 6c and the brushes 7a, 7b, 7c provide short-circuiting means.

Figure 2A:
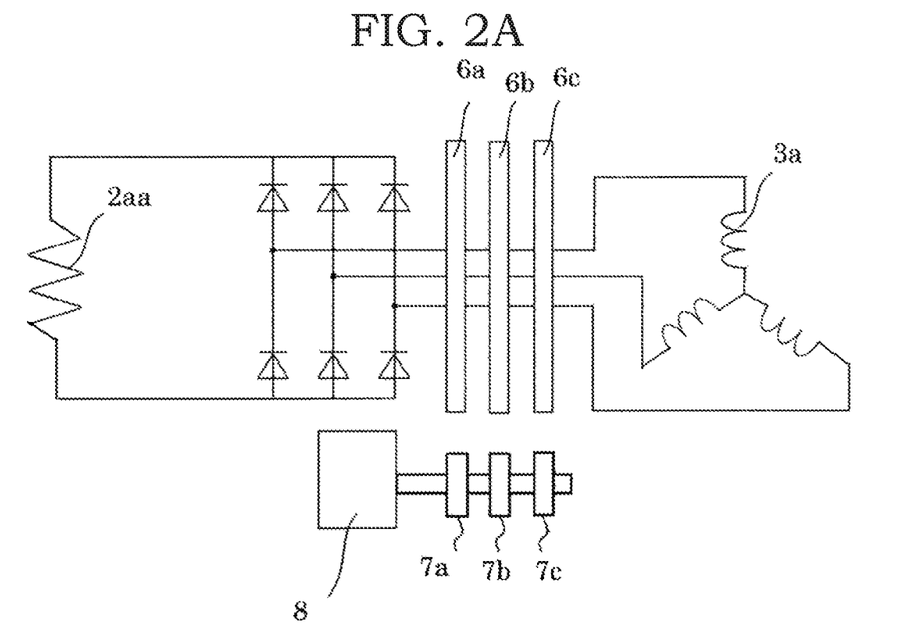
FIGS. 2A and 2B are schematic diagrams of a state of operation of brushes with respect to slip rings of Embodiment 1 of the invention.
Figure 2B:
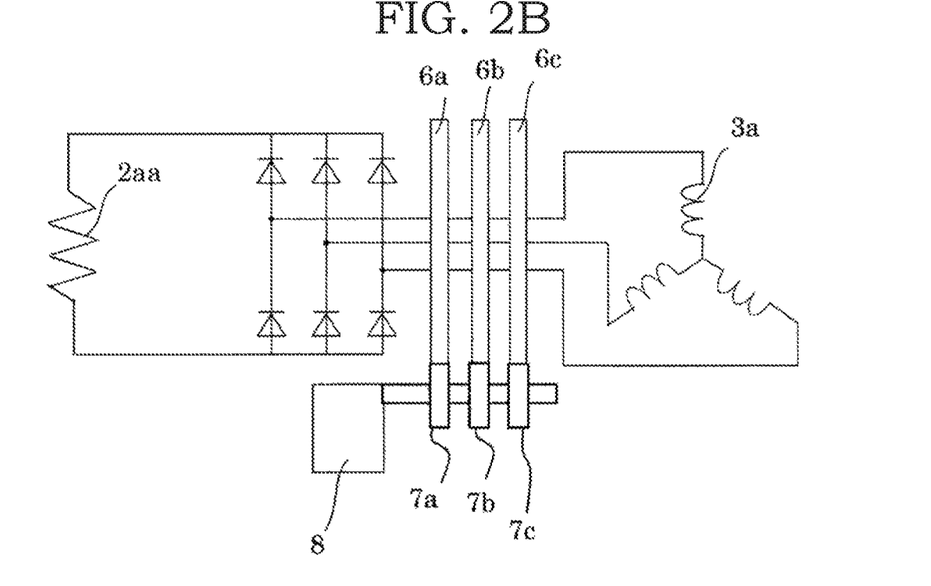

FIGS. 2A and 2B show the states of the brushes 7a, 7b, 7c and slip rings 6a, 6b, 6c. When supplying direct current to the field winding of the synchronous generator upon SFC starting and at rated load, the brushes 7a, 7b, 7c come into no contact with the slip rings 6a, 6b, 6c, as shown in FIG.

2A, bringing the three slip rings 6a, 6b, 6c into release state, and current generated in the AC exciter all flows into the rotary rectifier as it is.

Meanwhile, when causing a turning operation utilizing the AC exciter 3 as a motor, the brushes 7a, 7b, 7c are brought into contact with the slip rings 6a, 6b, 6c, as shown in FIG. 2B, thus three-phase short-circuiting the armature windings 3a of the AC exciter 3, and a d-axis two-phase winding and a q-axis two-phase winding of the AC exciter 3 are AC excited at a phase difference of 90 degrees, generating a torque with the AC exciter 3 as a turning motor. Herein, the armature windings 3a of the AC exciter 3 become identical functionally to rotor secondary windings of a common wound rotor induction motor, and the AC exciter 3 generates a motor torque.

The control of these operations is carried out by a control device 9. Also, the control device 9 controls an AC excitation inverter device 10 which supplies current to the field windings 3b of the AC exciter 3, a DC excitation thyristor device 11 which supplies current to the armature windings 4b of the permanent magnet synchronous generator 4, and an excitation-mode switching device 12 which switches between excitation modes in the field windings 3b, and furthermore, controls a static frequency converter 13 and a synchronous generator armature winding terminal connection selector 14.

In Embodiment 1, the area of contact between the slip rings 6a, 6b, 6c and the brushes 7a, 7b, 7c is increased, the difference in potential between the slip rings 6a, 6b, 6c and the brushes 7a, 7b, 7c is reduced, and the short circuit cable between the slip rings 6a, 6b, 6c is shortened, thereby fully reducing a voltage, which is generated between the short-circuited slip rings 6a, 6b, 6c, with respect to a drop in the diode forward voltage of a three-phase full-wave rectifier circuit, preventing rectification from occurring in the three-phase full-wave rectifier circuit.

Figure 3:
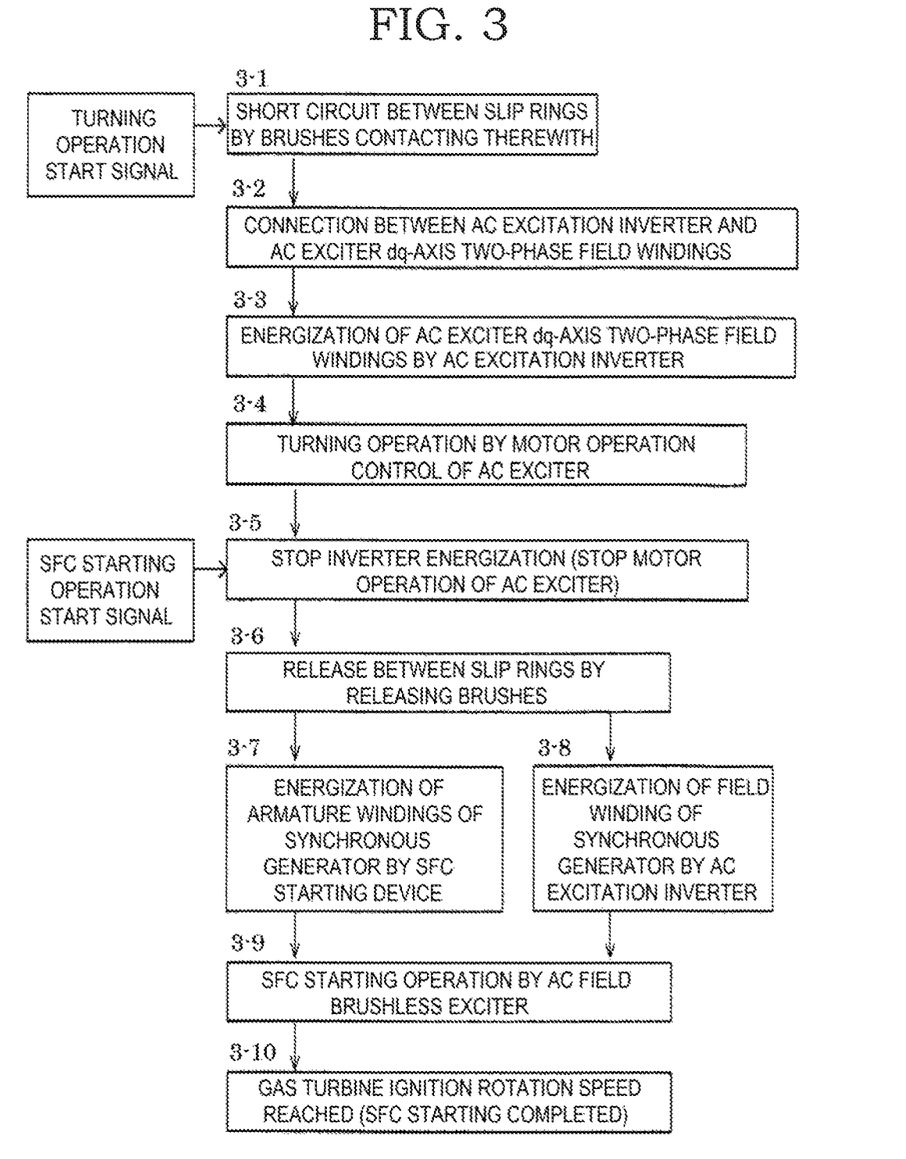
FIG. 3 is an operation flow chart of Embodiment 1 of the invention.

Next, FIG. 3 shows an operation flowchart of Embodiment 1 of the brushless synchronous power generation apparatus shown in FIG. 1.

As shown in FIG. 3, when carrying out a turning operation, the control device issues a command to the brush moving device to move the brushes, and the brushes come into contact with the slip rings, causing a short circuit between the slip rings (step 3-1). Also, the AC excitation inverter is connected to the d-axis and q-axis two-phase field windings of the AC exciter (step 3-2). Next, energization of the AC exciter d-axis and q-axis two-phase field windings by the AC excitation inverter is carried out (step 3-3), and a turning operation by the motor operation control of the AC exciter is carried out (step 3-4). Subsequently, when the rotation speed reaches a predetermined value or more, the energization of the inverter is stopped, and the motor operation by the AC exciter is stopped, based on an SFC starting operation start signal (step 3-5). Then, the contact between the brushes and the slip rings is released (step 3-6), energization of the armature windings of the synchronous generator by an SFC starting device is carried out (step 3-7), and at the same time, energization of the field winding of the synchronous generator by the AC excitation inverter is carried out (step 3-8). Then, an SFC starting operation by the AC field brushless exciter is carried out (step 3-9). Subsequently, when a gas turbine ignition rotation speed is reached, the SFC starting is completed, and a rated operation is entered (step 3-10).

Embodiment 2

Figure 4:
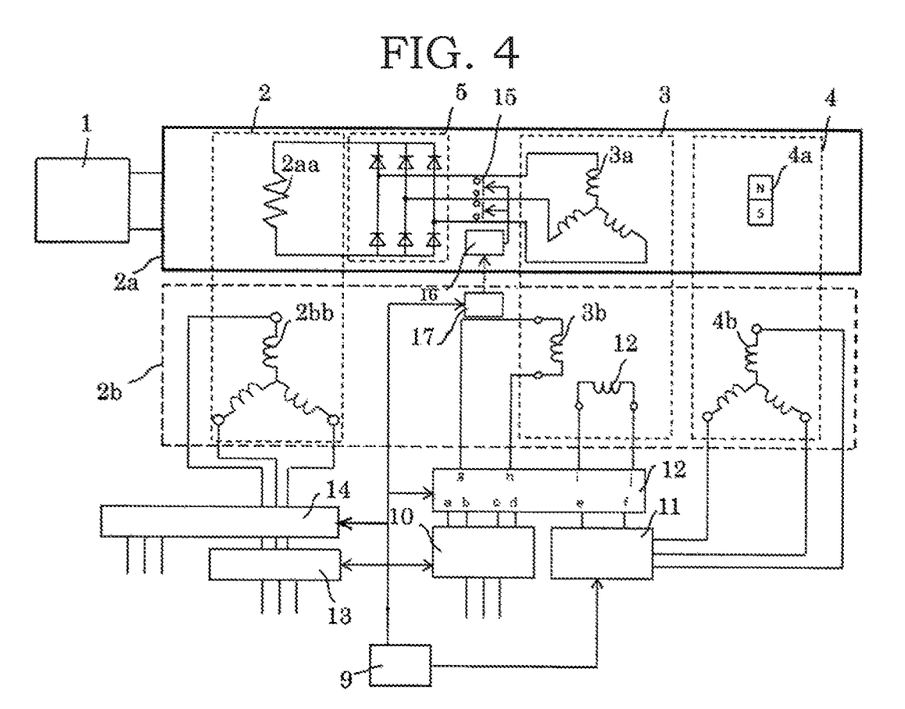
FIG. 4 is a schematic configuration diagram of a brushless synchronous power generation apparatus of Embodiment 2 of the invention.

FIG. 4 is a schematic configuration diagram of a brushless synchronous power generation apparatus of Embodiment 2 of the invention.

In Embodiment 2, as the short-circuiting means which three-phase short-circuits the armature windings 3a of the AC exciter 3 shown in Embodiment 1, the relationship between the slip rings and the brushes is replaced by a short-circuiting switch 15, which three-phase short-circuits the armature windings 3a of the AC exciter 3 built into the rotor 2a shaft of the synchronous generator 2, and a radio signal reception/switch control device 16.

A control signal from the control device 9 is received by the radio signal reception/switch control device 16 via a radio signal transmission device 17, and is configured to turn on the short-circuiting switch 15 when in turning operation and turn off the short-circuiting switch 15 when in brushless excitation.

Figure 5:
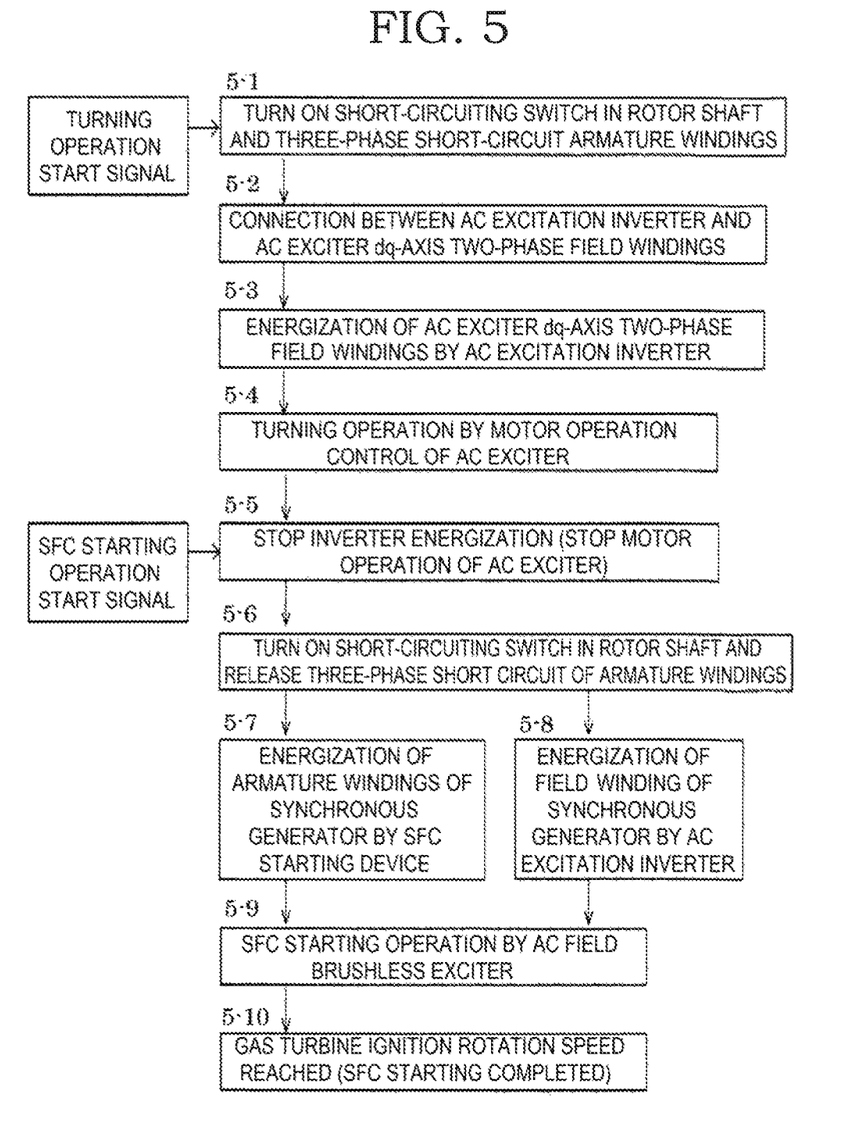
FIG. 5 is an operation flow chart of Embodiment 2 of the invention.

FIG. 5 is an operation flowchart with the operation flow shown in Embodiment 1 represented in conformity to Embodiment 2. Herein, in place of the three-phase short circuit between the slip rings shown in step 3-1, the armature windings are three-phase short-circuited by turning on the short-circuiting switch (step 5-1). Also, a configuration is such that the operation of contact between the slip rings and the brushes is carried out by the switch, meaning that a mechanical operation is carried out by an electrical operation, and the effect of higher reliability can thereby be expected.

Embodiment 3

Figure 6:
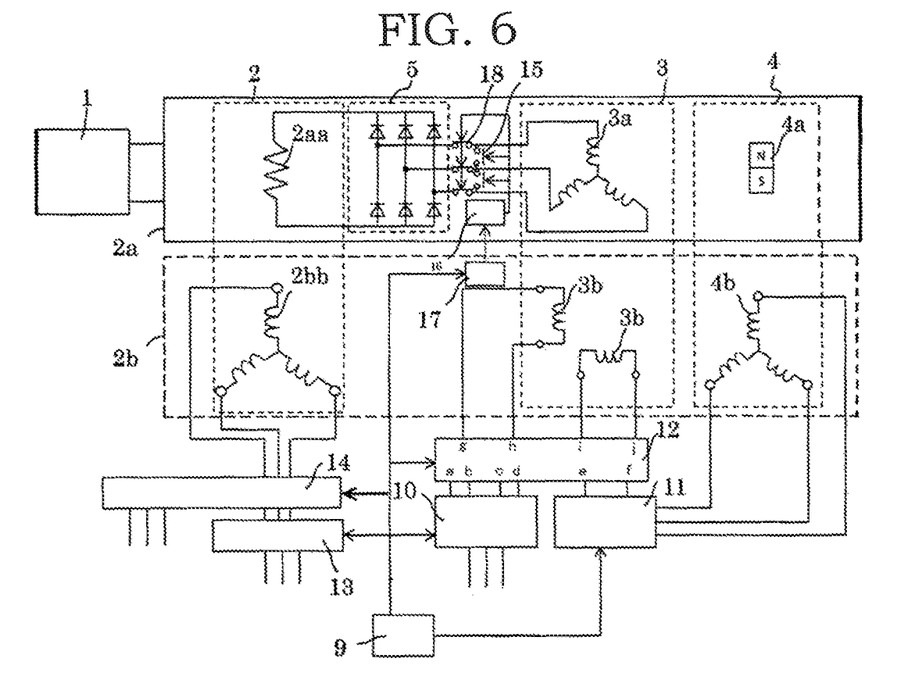
FIG. 6 is a schematic configuration diagram of a brushless synchronous power generation apparatus of Embodiment 3 of the invention.

FIG. 6 is a schematic configuration diagram of a brushless synchronous power generation apparatus of Embodiment 3 of the invention.

In Embodiment 3, as the short-circuiting means which three-phase short-circuits the armature windings 3a of the AC exciter 3 shown in Embodiment 1, the relationship between the slip rings and the brushes is replaced by the short-circuiting switch 15, which three-phase short-circuits the armature windings 3a of the AC exciter 3 built into the rotor 2a shaft of the synchronous generator 2, a releasing switch 18, and the radio signal reception/switch control device 16.

A control signal from the control device 9 is received by the radio signal reception/switch control device 16 via the radio signal transmission device 17, and when in turning operation, the short-circuiting switch 15 is turned on, while the releasing switch 18 is turned off. Also, when in brushless excitation, the short-circuiting switch 15 is turned off, while the releasing switch 18 is turned on.

Figure 7:
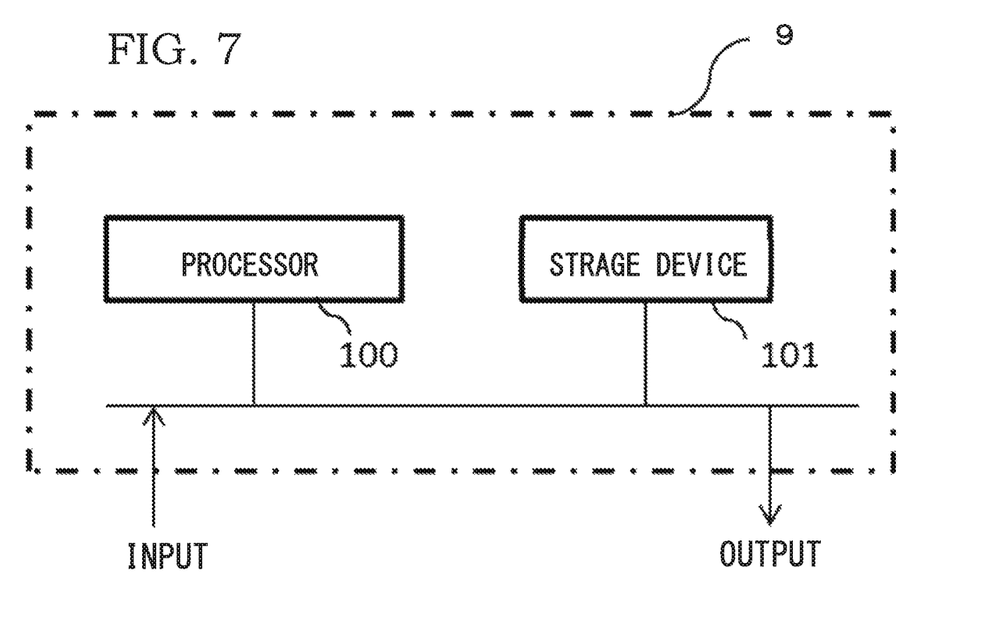
FIG. 7 is a block circuit diagram of the control device.

FIG. 7 shows an example of hardware of the control device 9. The control device 9 is composed of a processor 100 and a storage unit 101 as shown in FIG. 7. The storage unit 101 includes, although not shown, a volatile storage device such as a random access memory, and a nonvolatile auxiliary storage device such as a flash memory. The storage unit 101 may include, instead of a flash memory, an auxiliary storage device such as a hard disk. The processor 100 executes a program loaded from the storage unit 101. In this case, the program is loaded from the auxiliary storage device to the processor 100 via the volatile storage device. The processor 100 may output data of the calculation result and the like to the volatile storage device of the storage unit 101, or may store the data in the auxiliary storage device via the volatile storage device.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

The invention claimed is:

1. A synchronous power generation apparatus, comprising:
   a synchronous generator;
   an AC exciter directly connected to a rotor of the synchronous generator;
   a rotary rectifier attached to an armature of the AC exciter; and
   short-circuits which three-phase short-circuit armature windings of the AC exciter, wherein
   the armature windings of the AC exciter are three-phase short-circuited, causing the AC exciter to operate as an induction motor, thus rotating a rotor shaft of the synchronous generator at a low speed substantially lower than a rated speed, wherein
   the short-circuits are configured of slip rings, which are provided for respective three phases between the armature windings of the AC exciter and the rotary rectifier, and brushes which are movable with respect to the slip rings, and
   the slip rings and the brushes come into contact, thereby carrying out a three-phase short circuit,
   wherein responsive to the rotator shaft reaching the low speed, the slip rings and the brushes are released, thereby removing the three-phase short circuit.

2. A brushless synchronous power generation apparatus, comprising:
   a synchronous generator;
   an AC exciter directly connected to a rotor of the synchronous generator;
   a rotary rectifier attached to an armature of the AC exciter; and
   short-circuits which three-phase short-circuit armature windings of the AC exciter, wherein
   the armature windings of the AC exciter are three-phase short-circuited, causing the AC exciter to operate as an induction motor, thus rotating a rotor shaft of the synchronous generator, wherein
   the short-circuits are of a short-circuiting switch and a radio signal reception and switch control device, which are provided in the rotor shaft of the synchronous generator between the armature windings of the AC exciter and the rotary rectifier, and receives a turning operation control signal, connecting the short-circuiting switch, thereby carrying out a three-phase short circuit.

3. A brushless synchronous power generation apparatus, comprising:
   a synchronous generator;
   an AC exciter directly connected to a rotor of the synchronous generator;
   a rotary rectifier attached to an armature of the AC exciter; and
   short-circuits which three-phase short-circuit armature windings of the AC exciter, wherein
   the armature windings of the AC exciter are three-phase short-circuited, causing the AC exciter to operate as an induction motor, thus rotating a rotor shaft of the synchronous generator, wherein
   the short-circuits are of a short-circuiting switch, a releasing switch, and a radio signal reception and switch control device, which are provided in the rotor shaft of the synchronous generator between the armature windings of the AC exciter and the rotary rectifier, and receives a turning operation control signal, connecting the short-circuiting switch, and releasing the connection of the releasing switch, thereby carrying out a three-phase short circuit, preventing current of the armature windings of the AC exciter from flowing into the rotary rectifier.

4. The synchronous power generation apparatus of claim 1, wherein the low speed is about two to ten revolutions/min.

5. The synchronous power generation apparatus of claim 4, wherein the low speed is about three revolutions/min.

6. The synchronous power generation apparatus of claim 1, wherein the rated speed is about 2000 to 2400 revolutions/min.

7. The synchronous power generation apparatus of claim 1, wherein the low speed is about two to ten revolutions/min and the rated speed is about 2000 to 2400 revolutions/min.

8. The synchronous power generation apparatus of claim 7, wherein the low speed is about three revolutions/min.

9. The synchronous power generation apparatus of claim 1, wherein after the slip rings and the brushes are released, thereby removing the three-phase short circuit, the armature windings of the AC exciter are energized and the rotator shaft increases from the low speed to a speed approximately equal to the rated speed.

10. The synchronous power generation apparatus of claim 1, wherein the rated speed is a gas turbine ignition rotation speed.

* * * * *